Dec. 11, 1951　　　W. VAN B. ROBERTS　　　2,578,452
MECHANICAL FILTER
Filed May 14, 1949　　　　　　　　3 Sheets-Sheet 1
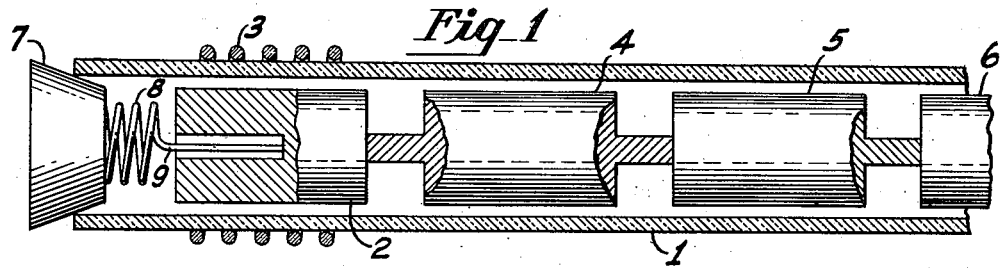
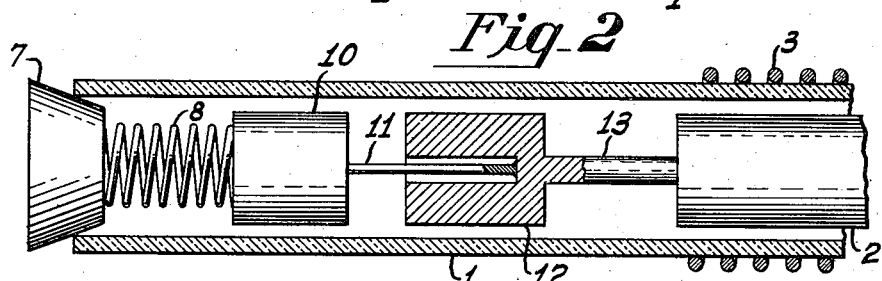
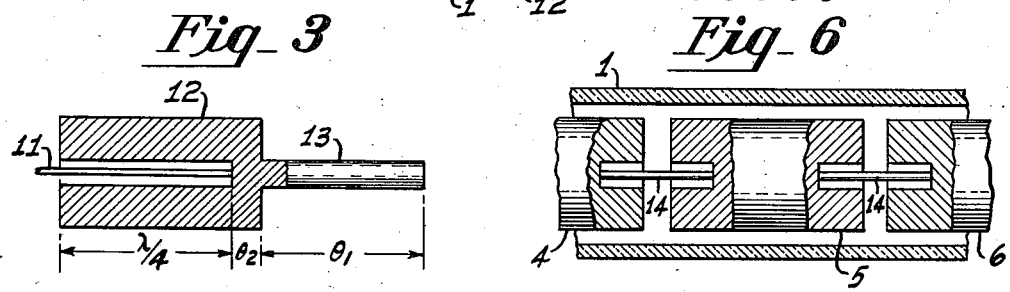
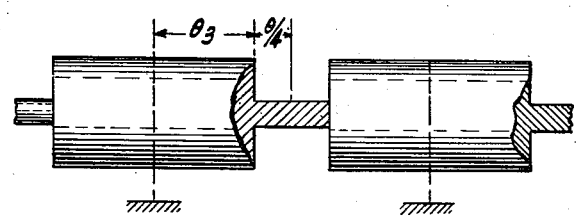
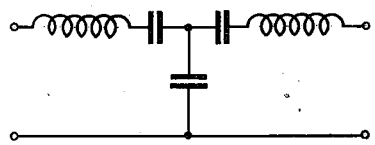
INVENTOR
WALTER VAN B. ROBERTS
BY Harry Tunick
ATTORNEY Patented Dec. 11, 1951

2,578,452

UNITED STATES PATENT OFFICE 2,578,452

MECHANICAL FILTER

Walter van B. Roberts, Princeton, N. J., assignor to Radio Corporation of America, a corporation of Delaware Application May 14, 1949, Serial No. 93,372

11 Claims. (Cl. 178—44)

This invention relates to mechanical filters, and more particularly to such filters of the magnetostrictively-driven band pass type.

As described in applicant's copending joint application, Serial No. 843,372, filed March 30, 1949, mechanical filters consisting of a plurality of resonant or tank elements joined by intervening coupling sections have certain advantages. The end elements of the filters are made to form the drive and take-off means for such filters, and for this purpose such end elements are preferably made of magnetostrictive material or are plated with magnetostrictive material, so that magnetostrictive conversion of electrical to mechanical energy and vice versa may be had. The latter or plating expedient is disclosed and claimed in the copending Burns application, Serial No. 84,373, filed March 30, 1949.

In some cases, it is desirable to provide magnetostrictive conversion by means of ferrite elements, ferrite having good magnetostrictive activity. With ferrite elements forming the drive and take-off means, or in other words, forming the end elements of the filter, the problem of attaching the ferrites firmly to the filter arises. The ferrites cannot be readily drilled for attaching wires. Furthermore, the ferrites cannot readily be made to form an integral part of the filter by soldering or cementing or by attachment thereto with sealing wax, as such techniques are difficult to carry out with ferrite and, also, such techniques generally result in changing the frequency of the pass band of the filter, which is undesirable.

Therefore, an object of this invention is to devise a means for attaching the ferrite end elements firmly to the other elements of the filter, without cement, solder or sealing wax, or without drilling holes in the ferrites. In other words, because of the structure of this invention there is no need for making a tight mechanical connection between the filter proper and the drive and take-off elements, if these are of different material such as ferrites.

It has been found, as described in the aforementioned joint application and as set forth herein, that the pass band of a multi-element mechanical filter may be narrowed by making the coupling elements of a neck-type filter (a neck-type filter is one in which the coupling elements of the filter are of smaller size than the resonant or tank elements) of very small size. It has been found that it is very difficult to fabricate both the tank and coupling elements from a single piece of material if the coupling elements are made extremely thin or of very small size, this being particularly true when the tank and coupling elements are figures of revolution and when fabrication by means of a lathe is attempted.

Another object of this invention is to devise a structure whereby the vibratory elements may be formed separately, so as to enable the production of very thin necks, and yet the elements may be caused to act for vibratory purposes as if made from a single piece of material. The separate elements can be tested and tuned individually.

In many mechanical filters, energy can travel through the filter in other modes than intended, thus giving rise to numerous undesired responses. Accordingly, a further object of this invention is to reduce these undesired responses.

In the more compact filter structures, it may be difficult to provide adequate electromagnetic shielding between input and output coils. Therefore, a still further object is to devise a structure whereby adequate shielding between input and output coils may be easily effected.

Briefly, the foregoing objects are accomplished in the following manner:

A plurality of resonant tank elements made of a material such as Dural are assembled end-to-end in a suitable container, for example a glass tube. Each of these elements has a thin tip or projection on at least one end thereof. A ferrite element is placed at each end of the assembly, and at the extreme ends a Dural element of special construction couples each end ferrite to a corresponding end compression spring, the whole assembly of the plurality of elements being pressed together by the action of these springs without, however, interfering with mechanical vibrations. In other words, a low pass filter is provided at each end of the assembly to apply pressure thereto without forming a path for the vibrations to get through to the special end support elements. A driving coil surrounds the tube at one end thereof for coupling to the drive ferrite, while a pickup coil surrounds the tube at its opposite end for coupling to the pickup or take-off ferrite. For shielding the input from the output circuit, the filter elements may be enclosed in a long brass tube which is grounded to suitable shielding enclosures around input and output circuits, the portion of the tube containing the ferrites being made of insulating material.

The foregoing and other objects of the invention will be best understood from the following description of some exemplifications thereof, reference being had to the accompanying drawings, wherein:

Fig. 1 is a partial cross-section through a somewhat idealized filter structure according to this invention;

Fig. 2 is a partial cross-section through a practical filter structure according to this invention;

Fig. 3 is a view on an enlarged scale of one of the elements of Fig. 2;

Fig. 4 is a schematic representation of a pair of resonant elements joined by a thin coupling element in a multi-section filter;

Fig. 5 is an electrical analog of one of the sections of a mechanical multi-section filter;

Fig. 6 is a partial cross-section through a modified type of filter; and

Figure 7:
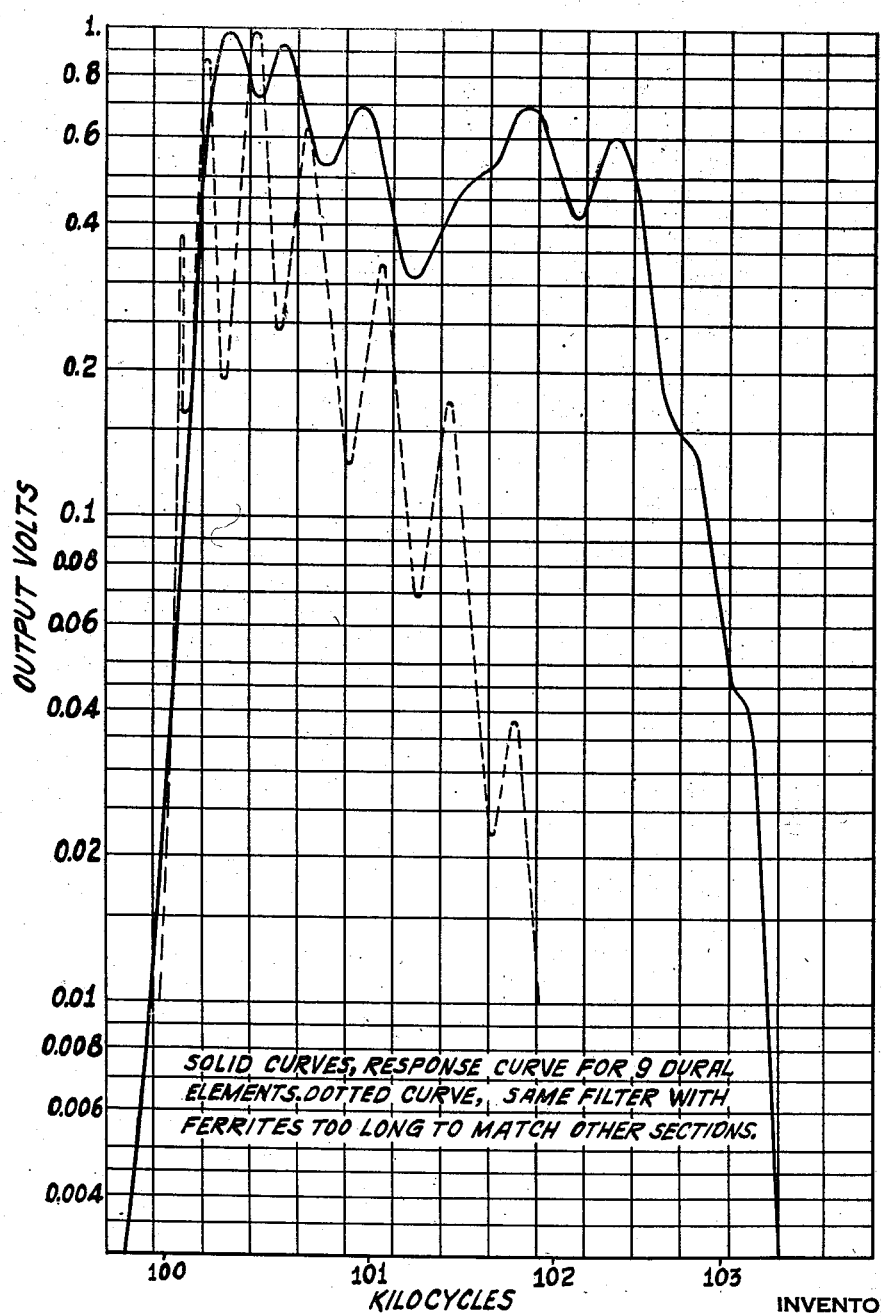
Figs. 7 and 8 are typical response curves of a filter constructed according to this invention.

Referring now to Fig. 1, which shows one end of a filter, say for example the input end, the filter elements are preferably mounted inside a glass tube 1. Arranged inside tube 1, in end-to-end relationship, is a plurality of filter elements 2, 4, 5, 6, etc. A ferrite rod 2 is one of the filter elements and is the endmost element of such filter. A coil 3 surrounds the tube 1 in such a position as to be electromagnetically coupled to rod 2. Coil 3 is the actuating coil for the filter as a whole, and since it is the input or driving coil, is supplied with alternating current from a suitable source to cause the magnetostrictive rod 2 to vibrate through magnetostrictive action.

Elements 4, 5, 6, etc. are resonant or tank elements made of a suitable material such as Dural. Element 4 has a tip or projecting portion of relatively small diameter on each of its two ends, but elements 5 and 6 and all the other Dural elements have tips or projecting portions on only one end thereof. Elements 4, 5, 6, etc. may be, and preferably are, of cylindrical configuration. All of the elements 4, 5, 6, etc. are identical in length of their main portions, and all of the tips are identical. The elements 4, 5, 6, etc. are so arranged in tube 1 that each tip is adjacent to the main or large-diameter portion of the adjacent element.

A cork 7 closes the input end of tube 1. In order to press the ferrite and Dural elements together, and to maintain them in good mechanical contact with each other, a compression spring 8 is provided, one end of this spring bearing against the inner surface of cork 7 and its opposite end being joined to a thin but rigid length 9 or wire which in turn extends into, and bears against the end of, an axial hole in rod 2. In this way, the spring pressure of spring 8 is applied at or adjacent the center of ferrite 2. The center of rod 2 is a motional node, and by applying the steady spring pressure at this point, loss of vibratory energy to the wire 9 is largely avoided.

It is desired to be made clear at this point that the output end of the filter is exactly similar in all respects to the input end shown, with a similar output ferrite, output coil, output-end spring, and output-end cork.

The natural resonant frequency of longitudinal vibration of the ferrite rod 2 is so chosen as to be equal to that of the main portion of the Dural elements 4, 5, 6, etc., but the mass of the ferrite is made only half that of the Dural elements. The filter is then the mechanical equivalent of a series of half-wavelengths of high impedance transmission line connected by short lengths of low impedance transmission line, the terminal half-wave portions being of half the impedance of the intermediate ones: the high impedance transmission line is represented by the main or large-diameter portions of each of the elements 2, 4, 5, 6, etc., while the low impedance transmission line is represented by the tips or projections between the adjacent elements 2 and 4, 4 and 5, 5 and 6, etc. Corresponding to the terminating resistance that would be employed in the electrical case, there is the mechanical damping of the ferrites, produced by their magnetostrictive coupling to the tuned coils wound around them.

Spring 8 and its counterpart at the opposite end of tube 1 provide a steady or bias pressure or stress upon the assembly of elements constituting the filter, and more particularly upon the connections between the separate elements, the alternating pressure or stress comprising signals (the input to coil 3) being superposed upon the steady or bias stress. By appropriate design of spring 8 and its counterpart, the bias or continuous unidirectional stress is made greater than the peak or maximum alternating value of the stress produced in rod 2 by any signals expected, so that for signals within the expected limits the joints between the separate elements 2, 4, 5, 6, etc. stay together as if solid. Therefore, for relatively weak signals or alternating vibrations the filter is rendered effectively monolithic, even though the component elements are physically separate.

In the manner above described, the separate elements 2, 4, 5, 6, etc. are compressed together and held together by the action of spring 8 and its counterpart at the opposite end of tube 1, to act for vibratory purposes as a single element, the elements being pressed together in such a way as to not interfere noticeably with mechanical vibrations. In addition, the ferrites 2, etc. are firmly mechanically connected to the adjacent resonant elements 4, etc. of the filter by pressure, without cement, solder or sealing wax.

When alternating current is supplied to coil 3, ferrite 2 is caused to execute longitudinal mechanical vibrations by magnetostrictive action, thus causing the entire filter to vibrate in a way and with a band pass effect more fully described in the aforementioned joint application. Since elements 4, 5, 6, etc. are separate elements, a tip of very small size may be fabricated on the end of each cylinder, or on each end of the cylinder, without undue difficulty and without danger of causing buckling or breaking of the tip. Also, the elements, being formed separately, can be tested and tuned individually.

A basic feature of this invention, which is the application of a steady bias stress to the connections between the separate filter elements, could also be achieved by arranging the filter with "hooks" on the separate elements, so that a bias tension could be applied, instead of the compression illustrated. Such a construction would eliminate any "buckling" of the array of elements and would also eliminate the supporting tube, together with any difficulties which might arise from the presence thereof, but such a construction requires a connection between elements which is more complicated than that shown in Fig. 1.

Fig. 1 is somewhat idealized, as previously mentioned, in that it shows an axial hole in the ferrite rod 2. In practice, such a hole would be rather difficult to make in ferrite, so in practice the supporting means at each end of the filter may be constructed as shown in Fig. 2.

In Fig. 2, the ferrite rod 2 is supported by a thin cylindrical section 13 of Dural which is substantially a quarter-wavelength long for the mid-frequency of the pass band. Section 13 is an integral part of another length 12 of Dural rod of larger diameter, length 12 being also substantially a quarter-wavelength long for said mid-frequency. Length 12 has a small axial hole (shown greatly exaggerated in Fig. 2 for purposes of clarity) drilled therein, to the inner end of which a thin rod or wire 11 is secured, the arrangement being such that rod 11 is secured to a motional node of the vibratory system 12, 13. The free end of rod 11 projects beyond the outer end of element 12, and such free end is held against a suitable slug element 10 through the action of compression spring 8 one end of which engages the outer end of slug 10 and the other end of which engages the inner face of cork 7. Spring 8 acts to force elements 10 and 11 together, and also to force elements 13 and 2 together.

Since element 13 is very thin or small compared to the ferrite 2, and since its left end is motionless, it imposes only a negligible impedance on the motion of the ferrite 2 at or near the operating frequency. Thus, element 12, 13 can be considered to be an auxiliary low pass filter through which spring pressure is exerted to hold the ferrite 2 against the remaining part of the filter, without providing a path for the transmission of vibrations from the ferrite 2 to such element. If desired, a plurality of elements like 12, 13 could be cascaded to further suppress vibrations "leaking out" from the supported end of the ferrite.

Referring to Fig. 3, which is a view on an enlarged scale of isolating element 12, 13, the axial hole in element 12 is drilled to a depth such that supporting wire 11 presses at a point or is secured to a point exactly a quarter-wavelength in from the outer end of element 12. The electrical lengths $\theta_1$ and $\theta_2$ are then chosen to provide quarter-wave resonance in the structure to the left of the left end of wire 11. From transmission line theory, it can be shown that this result is obtained when $\tan \theta_1 \times \tan \theta_2$ is equal to the ratio of characteristic impedances of the portions $\theta_2$ and $\theta_1$. In the mechanical case, the ratio of impedances is the same as the ratio of the square of the diameter of the larger portion 12 to the square of the diameter of the smaller portion 13.

Now, the only reason for not making $\theta_2$ infinitesimally small is that some material must be left for element 13 to be supported by. However, $\theta_2$ can be small enough so that $\tan \theta_2$ is much less than 1. Hence, since the ratio of squares of diameters is large, $\tan \theta_1$ must be very large to satisfy the condition for resonance; in other words, element 13 will be very little less than a quarter-wavelength long even though $\theta_2$ is not infinitesimal. It is probably sufficiently accurate to make $\theta_1 = \pi/2$ instead of calculating its exact theoretical value, so long as $\theta_2$ is small and the ratio of squares of diameters is large. In fact, it would be well to make $\theta_1$ a little too long, and then to clamp a ferrite between two isolating elements and measure the resonant frequency. If it is too low, elements 13 can be shortened until it is the same as that of the other ferrite.

The description given above in connection with Fig. 3 is a somewhat detailed discussion of the construction of isolating elements 12, 13.

The reason for operating the filter with its elements all squeezed together in the manner above described is to obtain the effect of having all the elements, including the ferrites, act like a single monolithic structure. To obtain this result, it is only necessary that the steady pressure exceed the maximum alternating stress in the joints, or connections between the elements of, the structure. For low levels of output voltage, the required steady or bias pressure or stress is quite small, since the joints are all located at points where the alternating stress is relatively low.

The detailed construction of the filter may be, and preferably should be, altered from the schematic showing of Figs. 1 and 2, in order to provide adjustment of pressure, closer fit of coil over ferrites, and means for grounding the Dural elements to prevent electrostatic coupling between coils. In a filter providing very great attenuation to frequencies only slightly outside the pass band it is important to provide a high degree of isolation between input and output circuits, as these circuits are still nearly resonant to frequencies only slightly outside the band. If the filter elements are enclosed in a long brass tube, grounding this tube to a partition between shielding enclosures around input and output circuits, as more fully disclosed in applicant's copending application, Serial No. 76,586, filed February 15, 1949, will prevent both magnetic and electrostatic coupling. On the other hand, a metal tube cannot be used around the ferrites themselves as it would shield them from their associated coils. It is preferable, therefore, to make the tube containing the complete filter out of metal in its central portion but out of insulating material in the sections containing the ferrites.

The bandwidth is determined by the tips which couple the resonators or elements together. The thinner the tips are the narrower the band, and the shorter they are the broader the band. In practice, however, it has been found that the bandwidth does not increase greatly even when the tips are quite short; in fact, a bandwidth of only a few percent can be obtained by using very small glass beads or seed pearls squeezed between simple cylindrical resonators. It appears that a certain amount of elasticity is obtained in the metal face of the cylinder itself by concentrating the force at a point thereof.

In choosing the bandwidth, trouble is encountered when the band is made very narrow or very broad. It is difficult to make the tips thin enough to give a very narrow band, and it is also difficult to make the resonator elements sufficiently identical in natural frequency. Identity of dimensions does not assure identity of frequency unless the material is perfectly uniform. The separately-formed elements should be tested and tuned individually.

Experiment shows that the frequency of mechanical resonance of a ferrite rod is affected by changes in temperature. In one rod tested, the frequency decreased about 33 parts in a million per degree centigrade rise in temperature.

Another cause of frequency change is variation of the D. C. field applied to the ferrite to produce magnetostrictive action. This effect is much more noticeable than ordinary temperature effects. In one specimen measured, a field of 100 oersteds caused over ½ of 1% increase in frequency. This is representative of fields used for magnetostrictive purposes. With larger fields the frequency increase tends to saturate, so that a 1% increase required 250 oersteds. While this effect complicates adjustments, it also (together with pressure effects to be discussed below) provides a means for fine adjustment of the ferrite frequency.

An even greater effect is produced by pressure applied longitudinally of the rod. This effect is rather complicated as it increases, at least within limits, with the magnetic field. A rough idea of the order of magnitude of the effect may be obtained from a test in which the frequency of a rod about $\frac{1}{16}$ inch square was increased nearly 5% by a force of 1100 grams weight, in the presence of a magnetic field such as used in practice. It may be that the effect of pressure is primarily to change the magnetization of the specimen, and that it is the magnetization that is the immediate cause of the frequency change. Certainly the change in length produced by the pressure is several orders too small to account for it.

On the other hand, if the band is made too wide the terminating resistance required is too large to be obtained by magnetostrictive action alone.

One band limit is the frequency at which all the elements vibrate in phase, so that the tips are alternately shortened and lengthened, the midportion of each being stationary. The tips then act as springs, and this frequency is the upper band limit.

The lower limit is the frequency at which each element vibrates at 180° phase difference from its neighbors, so that the tips move to and fro as a whole, thus acting like a small extra mass on the main element ends.

Fig. 4 shows a pair of elements in a multisection filter. The limiting frequencies of the bass band are assumed to be the frequencies at which adjacent elements vibrate in similar or opposite phase. In either case the centers of the resonator elements must be motional nodes, as indicated by the symmetry of vibration in the two cases. At the lower limiting frequency each resonator acts as if loaded by a half-wavelength tip at each end, and no stress occurs in the center of the thin element. At the upper limiting frequency each resonator operates as if the mid-points of the thin elements were clamped, and maximum stress occurs at these midpoints. Considering the structure as a transmission line, these two limiting frequencies are determined by the equations:

$$\tan \theta_3 = P_1/P_2 \cot \theta_4$$

for the lower frequency, where $\theta_3 < \pi/2$.

$$\tan \theta'_3 = -P_1/P_2 \tan \theta_4$$

for the upper frequency, where $\theta_3^1 > \pi/2$.

In these equations $P_1$ and $P_2$ are the characteristic impedances of the corresponding parts and the ratio $P_1/P_2$ is in the mechanical case the square of the ratio of the diameter of the resonator to the diameter of the thin connecting element, assuming both to be made of the same material. The primes are used in the second equation since the electrical lengths $\theta$ are different at the two different frequencies.

Somewhere within the pass band the electrical length of the half portion of the resonator element is exactly $\pi/2$. The fractional band width may then be defined as $$\frac{\theta_3^1 - \theta_3}{\pi/2}$$

and the only thing that remains to be done is to obtain a convenient expression for $\theta_3^1 - \theta_3$. One form of expression is obtained by using the formula for expanding $\tan(\theta_3^1 - \theta_3)$ and substituting therein the values of $\tan \theta_3^1$ and $\tan \theta_3$ given by the equations. This gives $$\tan(\theta_3^1 - \theta_3) = \frac{1 + \tan \theta_4 \tan \theta_4^1}{P_1/P_2 \tan \theta_4^1 - P_2/P_1 \tan \theta_4}$$

Or, alternatively, this equation can be further rearranged to give, $$\theta_3^1 - \theta_3 = \tan^{-1}(P_2/P_1 \tan \theta_4) + \tan^{-1}(P_2/P_1 \cot \theta_4^1)$$

Neither of these expressions permits simple substitution to obtain the exact band width, but since in practice $P_2/P_1$ is usually quite small, while neither $\theta_4$ nor $\theta_4^1$ is very different from $\pi/4$, there results the approximate equation:

Fractional band width =

$$\frac{\theta_3^1 - \theta_4}{\pi/2} = \frac{2}{\pi} \frac{P_2}{P_1} (\tan \theta_4 + \cot \theta_4^1)$$

For moderately narrow bands no distinction need be made between $\theta_4$ and $\theta_4^1$, and it will be seen that a minimum band width is obtained when these angles are in the vicinity of $\pi/4$, the band width being very little changed by considerable departure from these values. To illustrate, Fractional band with $\theta_4 = \pi/4$ is approx. $\frac{4}{\pi} P_2/P_1$ Fractional band with $\theta_4 = \pi/8$ is approx. $\frac{5}{\pi} P_2/P_1$ These two cases correspond to total length of thin portion =

$$\frac{\lambda}{4} \text{ and } \frac{\lambda}{8}$$

respectively.

As the Dural elements are small and easily made, a large number can be used, so that very steep sides on the band pass characteristic and very high attenuation outside the band can be obtained. Of course, as in all "distributed constants" filters there will be other response bands, and they must be suppressed by the tuned input and output coils, and perhaps also by other amplifying stages employing tuned lumped constants. The chief difficulty in adjusting the filter to give satisfactory performance is in getting a combination of end tunings and magnetic fields that results in a reasonably uniform response within the band. This must be done by a cut and try process.

The filter of this invention is approximately equivalent to an electrical band pass filter composed of sections like Fig. 5 connected end-to-end. In this case, the coil in the last series element has half the inductance of the intermediate series elements in the ladder. To correspond to this, the ferrite should have half the mass of the resonators forming the main part of the filter. In addition, the terminating resistance in the electrical case should be such as makes the effective Q of the last coil equal to the ratio of midband frequency to band width. It is assumed that in the mechanical case the Q of the ferrite should be reduced by magnetostrictive loading until its effective value is also the reciprocal of fractional band width.

As a preliminary to a discussion of the loading of the ferrite, consider the case of a pair of tuned circuits coupled together with coefficient of coupling K. Let the Q's of the individual circuits be $Q_1$ and $Q_2$. When coupled, it can be shown that the apparent Q of either circuit is equal to its individual Q divided by $(1+K^2 Q_1 Q_2)$.

Hence, if the ferrite be considered as the first tuned circuit, and its tuned output coil as the second tuned circuit, the effective Q of the ferrite will be $$\frac{Q_1}{1+K^2Q_1Q_2}$$

In order to terminate the filter correctly, this effective Q of the terminating ferrite must have a value determined by the reciprocal of the fractional band width, as noted above. For example, a 5% band would require an effective Q of only 20 in the terminating ferrite. (The Q of the ferrite is of course its mechanical Q.) This represents a very large reduction from the unloaded Q of a ferrite rod, which is of the order of 1000. To obtain so large a reduction, either K or $Q_2$ must be large. But it is not desirable to have $Q_2$ very large if a wide band is desired. Hence K should be made as large as possible, which means that the coil should be wound close over the ferrite, and an active ferrite used with near optimum magnetic field. If a wide enough band cannot be obtained in this way, additional mechanical damping of the ferrite vibrations must be employed, which represents a waste of energy. Additional damping may be obtained in various ways, such as operating in a viscous medium like oil, treatment by boiling in wax, or operating against a dissipative medium such as felt pressed against the end of the vibrating member. As an indication of the order of magnitude of the reduction of Q possible by means of magnetostrictive coupling as described above, it has been found possible to reduce the apparent Q of a coil having a Q of around 100 to about one-twentieth of its normal value by magnetostrictive coupling to a ferrite bar having a Q of the order of 1000. Using these figures, since $1+K^2Q_1Q_2=20$, $Q_1=100$ and $Q_2=1000$, we have $K^2=.00019$. Thus, only a rather narrow band filter can be properly terminated by magnetostrictive coupling resistance alone.

The "tips" shown in Figs. 1 and 2 are by no means the only way that the resonant elements may be coupled. A modified type of coupling is shown in Fig. 6. A hole is drilled in each end of each Dural resonator 4, 5, 6, etc. to a depth of about one-eighth wavelength and a thin rod 14, about a quarter-wavelength long, is inserted in the adjacent holes. This gives a somewhat looser coupling than if the same rods were used as "tips," as they connect points of less motion than the ends of the resonators. The ends of the elements adjacent to the ferrites should be drilled deeper, so that the effective coupling is not increased by the rod operating against the end of the ferrite.

It is also possible according to this invention to use various tiny spring members squeezed between simple solid cylindrical elements. The difficulty with such a structure lies in making such minute elements reasonably identical.

Figure 8:
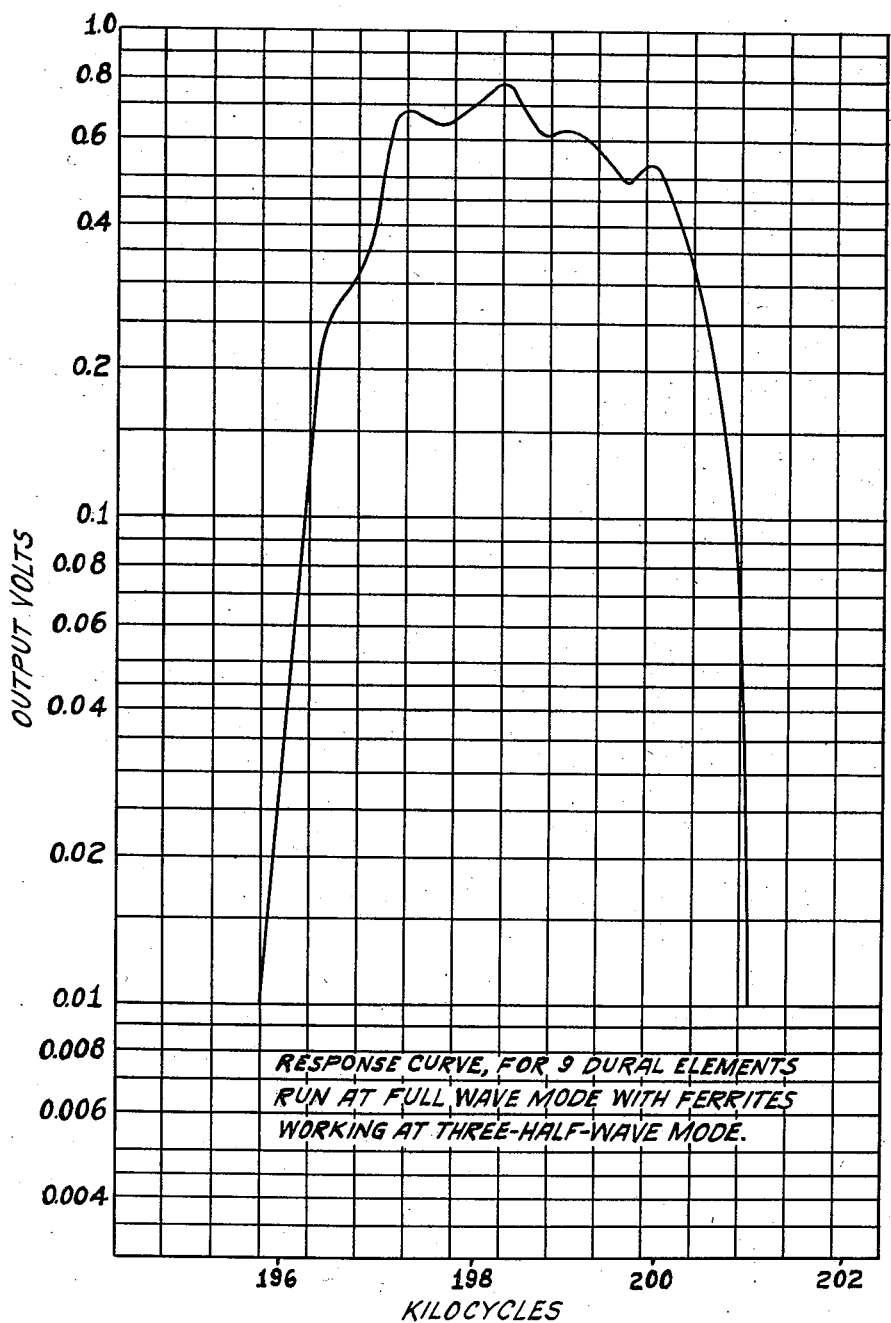

Now referring to Figs. 7 and 8, these figures illustrate the performance of a filter constructed basically as shown in Fig. 2, with nine Dural elements each one inch long and .1875" in diameter, with tips ¼" long and about .035" in diameter. These figures are response curves of filters according to the corresponding legends on the figures. From an examination of these curves, it may be seen that the width of the pass band in each case is relatively narrow, and the band pass characteristics are rather steep-sided, both of which features are desirable. Also, the curves are rather smooth along their tops, which means that undesired responses of the filter have been reduced to a substantial extent.

By the use of the structure described, including a metallic tubular container for the filter, adequate shielding between input and output coils may be effected.

It may be seen, from all of the foregoing, that the objects of this invention have been accomplished. The ferrite end elements, or drive and output elements, are coupled to the other elements of the filter in a rather simple manner, without the use of cement, solder or sealing wax, and without drilling in the ferrites. At the same time, the arrangement of this invention allows extremely thin necks to be utilized in the filter, giving a narrow pass band. In addition, undesired responses are reduced by the arrangement of the present invention, and by such arrangement adequate shielding of the input coil from the output coil may be easily effected.

What I claim to be my invention is as follows:

1. A mechanical filter, comprising a plurality of substantially similar physically separate resonant elements arranged substantially in alignment, a magnetostrictive resonant element coupled to each end of the line of elements, each of said magnetostrictive elements having a mass substantially one-half that of each of said plurality of elements, connecting means between contiguous ones of the plurality of elements and between the two end elements of said plurality and the contiguous magnetostrictive elements, and means for applying to and maintaining in each of said connecting means a continuous unidirectional stress, whereby for relatively weak vibrations said filter is rendered effectively monolithic.

2. A mechanical filter, comprising a plurality of substantially similar physically separate resonant elements arranged substantially in alignment, an elongated magnetostrictive resonant element coupled to each end of the line of elements, each of said magnetostrictive elements having a mass substantially one-half that of each of said plurality of elements, connecting means between contiguous ones of the plurality of elements and between the two end elements of said plurality and the contiguous magnetostrictive elements, and at least one compression spring having one end engaging a fixed support and its opposite end engaging the adjacent end magnetostrictive element near the center of the length thereof, said spring serving to apply to and maintain in each of said connecting means a continuous unidirectional stress.

3. A mechanical filter, comprising a plurality of substantially similar physically separate resonant elements arranged substantially in alignment, an elongated magnetostrictive resonant element coupled to each end of the line of elements, each of said magnetostrictive elements having a mass substantially one-half that of each of said plurality of elements, connecting means between contiguous ones of the plurality of elements and between the two end elements of said plurality and the contiguous magnetostrictive elements, each of said connecting means consisting of a portion of reduced size integral with a corresponding one of said plurality of elements, and at least one compression spring having one end engaging a fixed support and its opposite end engaging the adjacent end magnetostrictive element near the center of the length thereof, said spring serving to apply to and maintain in each of said connecting means a continuous unidirectional stress.

4. A mechanical filter, comprising a plurality of elongated physically separate resonant elements arranged substantially in alignment, separate connecting means between each pair of adjacent elements, each of said connecting means consisting of a thin rod having a length of substantially one-quarter of the wavelength corresponding to the resonant frequency of said elements, the two ends of each rod engaging the bottoms of corresponding aligned longitudinally-extending recesses in two adjacent elements, and means for applying to and maintaining in each of said rods a continuous unidirectional stress, whereby for relatively weak vibrations said filter is rendered effectively monolithic.

5. A mechanical filter, comprising a plurality of elongated physically separate resonant elements arranged substantially in alignment, separate connecting means between each pair of adjacent elements, each of said connecting means consisting of a thin rod having a length of substantially one-quarter of the wavelength corresponding to the resonant frequency of said elements, the two ends of each rod engaging the bottoms of corresponding aligned longitudinally-extending recesses in two adjacent elements, each of said recesses having a depth of substantially one-eighth of said wavelength, and means for applying to and maintaining in each of said rods a continuous unidirectional stress, whereby for relatively weak vibrations said filter is rendered effectively monolithic.

6. A mechanical filter, comprising a plurality of physically separate resonant elements longitudinally disposed in end-to-end relationship, a magnetostrictive element coupled to one end of the line of elements, longitudinal coupling means between adjacent resonant elements and between the end resonant element and the magnetostrictive element, an isolation filter coupled to said magnetostrictive element, and means coupled to said isolation filter for applying steady pressure through the same to all of said elements to maintain them in assembled relation and to maintain in each of said coupling means a continuous longitudinal stress, said isolation filter including a metallic body having a portion of reduced cross-section which engages said magnetostrictive element and also having a portion of larger cross-section, said pressure applying means being coupled to said isolation filter by means of a thin rod opposite ends of which engage said applying means and said body adjacent that end of the reduced portion thereof which is remote from said magnetostrictive element.

7. A mechanical filter in accordance with claim 6, wherein the reduced portion of said body has a length of substantially one-quarter of the wavelength corresponding to the resonant frequency of said resonant elements.

8. A mechanical filter in accordance with claim 6, wherein the reduced portion of said body has a length of substantially one-quarter of the wavelength corresponding to the resonant frequency of said resonant elements and wherein the larger portion of said body has a length of substantially one-quarter of said wavelength.

9. A mechanical filter, comprising a plurality of physically separate resonant elements longitudinally disposed in end-to-end relationship, a magnetostrictive element coupled to one end of the line of elements, longitudinal coupling means between adjacent resonant elements and between the end resonant element and the magnetostrictive element, an isolation filter coupled to said magnetostrictive element, and means coupled to said isolation filter for applying steady pressure through the same to all of said elements to maintain them in assembled relation and to maintain in each of said coupling means a continuous longitudinal stress, said isolation filter including a metallic body having a portion of reduced cross-section which engages said magnetostrictive element and also having a portion of larger cross-section, said pressure applying means including a compression spring one end of which engages a fixed support, said pressure applying means being coupled to said isolation filter by means of a thin rod one end of which is coupled to the other end of said spring and the opposite end of which engages said body adjacent that end of the reduced portion thereof which is remote from said magnetostrictive element.

10. A mechanical filter in accordance with claim 9, wherein the coupling between one end of said rod and said other end of said spring is effected through a slug element of large cross-section one face of which engages said one end of said rod and the opposite face of which engages said other end of said spring.

11. A mechanical filter in accordance with claim 9, wherein the reduced portion of said body has a length of substantially one-quarter of the wavelength corresponding to the resonant frequency of said resonant elements and wherein the larger portion of said body has a length of substantially one-quarter of said wavelength.

WALTER van B. ROBERTS.

REFERENCES CITED

The following references are of record in the file of this patent:

UNITED STATES PATENTS

| Number | Name | Date |
| --- | --- | --- |
| 1,654,123 | Hartley | Dec. 27, 1927 |
| 1,666,681 | Burgess | Apr. 17, 1928 |
| 1,784,830 | Flanders | Dec. 16, 1930 |
| 1,852,795 | Wegal | Apr. 5, 1932 |
| 2,063,943 | Pierce | Dec. 15, 1936 |
| 2,091,250 | Blackman | Aug. 31, 1937 |
| 2,495,740 | Labin | Jan. 31, 1950 |
| 2,501,488 | Adler | Mar. 21, 1950 |

FOREIGN PATENTS

| Number | Country | Date |
| --- | --- | --- |
| 291,521 | Great Britain | June 5, 1928 |